United States Patent [19]
Howes

[11] Patent Number: 5,944,862
[45] Date of Patent: Aug. 31, 1999

[54] METHODS RELATED TO MAKING DECORATIVE GLASS WINDOWS

[76] Inventor: Stephen Edwin Howes, 3481 W. Hillsboro Blvd., Apt. 102, Coconut Creek, Fla. 33064

[21] Appl. No.: 08/976,326

[22] Filed: Nov. 21, 1997

Related U.S. Application Data

[62] Division of application No. 08/573,764, Dec. 18, 1995, Pat. No. 5,783,264, which is a continuation of application No. 07/807,236, Dec. 16, 1991, abandoned.

[51] Int. Cl.$^6$ .................................................. B44F 1/06
[52] U.S. Cl. .............................................. 65/60.3; 428/13
[58] Field of Search ................... 428/13, 38, 60; 65/603; 264/220

[56] References Cited

U.S. PATENT DOCUMENTS

| | | | |
|---|---|---|---|
| 3,533,889 | 10/1970 | Powell | 428/38 X |
| 3,998,680 | 12/1976 | Flint | 428/34 X |
| 4,335,170 | 6/1982 | Butler | 428/38 |
| 4,822,680 | 4/1989 | Catalano et al. | 428/429 X |
| 5,061,531 | 10/1991 | Catalano | 428/34 |
| 5,089,076 | 2/1992 | Leach et al. | 156/100 |
| 5,558,827 | 9/1996 | Howes | 264/220 |

Primary Examiner—Deborah Jones
Attorney, Agent, or Firm—Wood, Herron & Evans, L.L.P.

[57] ABSTRACT

A decorative window consists of thick transparent plastic resin layer laminated to a sheet of glass. The outer surface of resin layer includes decorative features, such as deeply contoured pictographic images and finely detailed textured surfaces. The decorative window is produced as replica of a glass master originally made using conventional grinding and surfaces finishing techniques. The master is then covered with a mixture of silicone, catalysts for curing the silicone, and a light oil to form a mold. After curing, the mold is removed from the glass master, inverted and a glass sheet, which has been prepared for the process by being coated with organosilane ester, is clamped thereto. The mold cavity is then filled with a mixture of a clear plastic resin, catalysts for curing the resin, and organosilane ester. After curing, the replicated decorative window is removed from the mold.

16 Claims, 2 Drawing Sheets

METHODS RELATED TO MAKING DECORATIVE GLASS WINDOWS

This application is a divisional of application Ser. No. 08/573,764, now U.S. Pat. No. 5,783,264, filed Dec. 18, 1995 which is a continuation of application Ser. No. 07/807, 236 filed Dec. 16, 1991 (now abandoned).

BACKGROUND OF THE INVENTION

1. Field of the Invention

This invention relates generally to decorative windows, and, more specifically, to windows having the appearance of textured and deeply contoured glass and to a method of making such windows.

2. Background Information

Decorative windows composed of contoured and textured glass have been made for many generations, reaching a peak in popularity as architectural elements in the last century. Such windows are currently enjoying a revival in popularity, being used particularly as central elements in front doors and as adjacent elements above and beside such doors. Such windows are also being used increasingly in commercial applications for decorative purposes and to form portions of partitions.

In the traditional process, such windows are made from relatively thick plate glass, having various sorts of grooves and other contours ground therein and polished to restore smooth surfaces with desirable optical properties. Certain portions of glass surfaces are textured using sand blasting, acid etching, or a process called "glue chipping" in which an adhesive applied to a sand blasted surface is stripped to leave a specific pattern. Such windows can also be made as composites of a number of glass panels having deeply beveled edges joined by lead strips contoured for this purpose.

A principle disadvantage of windows of this kind is their cost. A window of moderate size and complexity can easily cost over one thousand dollars, due particularly to the large amount of skilled labor necessary in its production. Furthermore, windows of this type have disadvantages associated with the mechanical and thermal properties of glass. The effects of the low impact resistance of glass are often accentuated by deep cuts with sharp internal corners made in the application of a decorative design, and the transfer of heat between the interior and exterior regions of a building through glass panes increases heating and air conditioning costs. Also, decorative windows made as composites of various glass panels cannot be used in many architectural applications because building codes require the use of safety glass windows in entry doors and load bearing walls.

DESCRIPTION OF THE PRIOR ART

A number of attempts have been made to simulate traditional decorative windows using various manufacturing processes having lower associated costs. For example, windows with decorative designs and surfaces have been injection molded using clear thermoplastic materials, such as certain types of polycarbonate. However, injection molding has a serious disadvantage in the high cost of the tooling required. The high cost of the dies required in this application is particularly significant, since suppliers of such types of windows and associated architectural elements generally need to have an inventory including a large number of window sizes and design patterns. Further, injection molded thermoplastic windows have not generally met with commercial success as fine architectural elements, because they do not look and feel like real glass. Rather, thermoplastic windows are much too flexible compared to glass and transmit and reflect light differently than real glass. In addition, limitations in the ability of the die casting process to produce certain features, such as sharp internal and external edges, detract from the appearance of plastic substitutes for decorative glass panels.

A method for making a solid, continuous plastic part with a textured surface simulating stained glass is described in U.S. Pat. No. 3,848,046, issued to M. W. Machet on Nov. 12, 1974. In accordance with this method, a mold is first made by pouring a gel substance, such as standard clear gelatin in an aqueous liquid form, into a mold surface to form a gel layer. Before this layer hardens, an absorbent, such as dry powdered gelatin, is sprinkled on its surface. This powder absorbs moisture, swells, and merges into the gel surface while causing shrinkage of the surface, forming a nodular surface texture. After the gelatin has hardened, a stained glass simulating material, such as polyester resin prepared in a liquid form with a catalyst added, is poured on the textured surface. After the resin hardens, the gelatin mold is dissolved in water and washed off the resin part, which is left as a finished article. In a modification of this process, a hardened plastic framework, including a number of openings, is dropped into the gelatin after the absorbent is added but before the gelatin hardens. Textured resin material is thus allowed to harden in the openings within the framework, simulating a window with multiple panes. While the gelatin mold produced in this process is certainly less expensive than the steel molds required for use in the injection molding process, it is only capable of producing a single finished article. Also, this process produces only a random nodular surface texture; it does not produce pictorial, sculptured designs within the surface of the finished article.

U.S. Pat. No. 3,546,051, issued to R. Utz on Dec. 8, 1970, describes a method for simulating the overall appearance of a stained glass window by providing a glass pane behind an injection molded plastic framework including a pattern of ribs forming pictorial fields. Various pictorial fields in the pane are colored using stencils. The framework is metallized by the application of metal foil under heat and pressure, by vacuum deposition, or by spraying. While this patent is directed at making a realistic framework, nothing is done about the glass except for coloring.

Methods for making simulations of decorative glass windows using thermoplastic films and thin layers of resins adhered to glass panes have been described in a number of U.S. Patents. For example, U.S. Pat. No. 3,713,958, issued to R. S. McCracken on Jan. 30, 1973, describes a structure in which a coating of a substantially clear resin, such as an epoxy, vinyl, acrylic, or polyester type, is applied to one side of a glass pane, while light-transmissive glass tint is applied to the opposite side to simulate stained (colored) glass. For the resin, a copolymer of N-butyl methacrylate and methyl methacrylate in aromatic solvents was found to be compatible with glass.

U.S. Pat. No. 4,335,170, issued to D. Butler on Jun. 15, 1982, describes a method of simulating stained and leaded glass windows in which a very thin polyester film is attached to a sheet of glass using an adhesive. Individual film segments are cut to correspond with design segments having different colors. After the adhesive is applied to the film, a soap solution is applied thereon to neutralize the effect of the adhesive during the process of positioning the film on the glass. After the film is positioned on the glass, the soap solution is forced outward by pressure with a squeegee so that adhesion occurs.

U.S. Pat. No. 4,791,010, issued to P. A. Hanley et al. on Dec. 13, 1988, describes the application of a unique liquid mixture of ink and varnish to a glass pane in order to produce a simulated etched glass appearance. A framework of spacers is then placed atop the glass, adjacent to its edges, surrounding the ink and varnish image, and another glass pane is placed atop the spacers. These items are then formed into a permanent assembly, with the image protected on the inside surface of the first glass pane, as a sealing materials are applied around outer surfaces of the spacers.

U.S. Pat. No. 4,154,880, issued to F. E. Drennan on May 15, 1979, describes a window pane with a decorative molding on a side, attached by an adhesive strip. The molding includes flanges which mechanically lock with the adhesive strip. This patent indicates that areas of the glass adjacent to the molding sections can be of different colors or can have different surface treatments, such as sandblasting.

The methods described in the above paragraph have the disadvantage of providing only very thin coatings on the glass surfaces. While U.S. Pat. No. 3,713,958 to McCracken describes the texturing of the resin with a rod or other tool to provide an irregular or wavy surface as produced by medieval methods of making glass, none of these approaches are capable of providing the deeply contoured or sculptured appearance, including recognizable pictorial elements, associated with many decorative windows. Furthermore, none of these techniques can provide the wide variety of surface finishes associated with decorative glass at a reasonable cost.

A method for making a different sort of decorative panel is proposed in U.S. Pat. No. 3,516,893, which was issued to A. J. Gerard on Jun. 23, 1970. A printed acetate fabric, having a colored design, is adhesively attached on one side to a sheet of tempered glass and on the opposite side to a backing sheet, which is preferably methacrylate ester polymer. The adhesive is of a type, such as a mixture of acetone and butyl acetate, which totally or partially dissolves the acetate fibers of the fabric without destroying the color and pattern of the printed design. After the adhesive is cured, the tempered glass is shattered, creating a mosaic effect while retaining its panel form.

A number of patents describe methods for the simulation of multi-pane windows in structures having a continuous pane of glass to which other elements of substantial thickness are attached. For example, U.S. Pat. No. 4,495,739, issued to F. E. Drennan on Jan. 29, 1985, and U.S. Pat. No. 4,518,446, issued to F. E. Drennan on May 21, 1985, describe a decorative window and a method for manufacturing, wherein ornamental lead strips are attached around the edges of one or more glass segments having an edge thickness of about one eighth of an inch, where each glass segment is bonded to an underlying glass pane, and where the strip is held in place by a polysulfide adhesive carried in its channel and mechanically locked by inwardly directed flanges at its edges. U.S. Pat. No. 4,904,513, issued to E. De Nicolo on Feb. 27, 1990, describes a plurality of plates with beveled edges being adhesively attached to a single backing pane of glass, preferably through the use of a layer of polyvinyl butyrate under conditions of heat and pressure. In one variation, decorative strips are also glued in place between the beveled plates.

Some prior art patents describe either modifying a single glass pane to look like a multi-pane window, or alternately and additionally, attaching one or more additional pieces of glass to a backing pane. For example, U.S. Pat. No. 4,488,919, issued to D. R. Butler on Dec. 18, 1984, describes methods for making a simulated multi-pane beveled and leaded glass window by forming beveled groves to subdivide a glass or plastic plate, with smooth surfaces on both sides, into design segments of unrelieved panels. Lead strips are subsequently attached to the flat bottom walls of these grooves, which are preferably formed by machining. In an alternate method, the panel can be formed by injection molding. In an alternative construction, segments having a substantial thickness, such as sheets of glass, polycarbonate, or poly(methylacrylate) up to about one quarter inch in thickness, may be laminated to a base pane.

Certain design segments can be provided with a jeweled glass appearance by securing transparent shapes, having flat inner surface and facetedor smoothly curved outer surfaces, in place using a pressure-sensitive adhesive. U.S. Pat. No. 4,619,850, issued to T. J. Charlton on Oct. 28, 1986, describes the attachment of a die cast lead component to each side of a sheet of glass, thereby simulating lead strips holding individual pieces of glass. Surface treatments, such as coloring, sand blasting, or "glue chipping" conventionally applied to decorative glass windows may be applied if desired to various zones of the glass. In a modified version, a beveled glass layer is adhesively bonded to a zone within the lead components.

One method of replicating an article is to form a mold over the surface of an original article using silicone. Then, the formed mold is then filled with a resin, which is allowed to cure within the mold before it is removed as a replica. Traditional mold release agents, such as Teflon or silicone, have been sprayed on solid surfaces, to prevent adhesion between the mold material and the cured resin replica articles. Such agents have also been used to facilitate the removal of molds poured around original objects. The mild release agents are applied to the surface of the original object before the mold is made, or to the mold itself before the addition of material to be molded into a replica.

The removal of a silicone mold from a glass master posed particular problems. The adhesive forces between the silicone and the glass were so great that as few as one in twenty molds were successfully removed from the masters without serious damage using conventional prior art mold release agents. Furthermore, the use of traditional mold release agents, applied to the master before pouring the mold, rendered the mold unacceptable for producing replicas of adequate quality since the agents left impressions in the mold which were subsequently transferred to the replicas as roughened surfaces. Due to the intended use of replicas to transmit light and to produce aesthetic effects similar to those produced by cut and polished glass surfaces, the production of plastic decorative glass replicas is much more sensitive to blemishes than is the production of virtually all other plastic parts by molding processes.

One potential solution to the prior art problems of using the decorative glass replica in architectural applications, such as doors and windows, is forming the plastic decorative layer on a conventional glass pane, which then acts as a backing for the decorative plastic layer. A technical problem still requiring resolution is the adhesion between a cured resin plastic layer and the glass pane used as the backing plate. Excellent adhesion is required, so that the resulting decorative windows can be used in exterior architectural applications without delamination occurring due to large amount of thermal expansion which occurs between hot summer days and cold winter nights.

SUMMARY OF THE INVENTION

In accordance with one aspect of this invention, there is provided a decorative transparent member including a flat sheet of glass and a cured transparent layer of plastic resin of substantial thickness laminated to the flat sheet of glass. The layer of plastic resin extends as a single continuous layer to a border area around a periphery of the first sheet of glass. The layer of plastic resin has a flat inner surface and an outer surface including deeply contoured pictographic features.

In accordance with another aspect of this invention, there is provided a process of preparing a decorative transparent member having a cured resin layer adhered to a glass sheet with a decorative design formed in the cured resin layer and remote from the sheet. The process includes the steps of coating the glass sheet with an adherent material and clamping a mold to the glass sheet. The mold has a flat peripheral region and a cavity extending inward within the peripheral region, the peripheral region being in contact with a the glass sheet. In addition, the process includes filling the internal cavity with a catalyzed transparent plastic resin including the adherent material and allowing the resin to cure within the internal cavity. Finally, the process includes removing the mold from the cured resin and adhered glass sheet.

In accordance with yet another aspect of this invention, there is provided a method for making a mold of a glass master for subsequent use in fabricating replicas of the master. The method includes the steps of providing a surrounding framework of upstanding walls spaced apart from the glass master and preparing a catalyzed silicone mixture by mixing silicone, a catalyst, and a light oil. The method then includes pouring the mixture into the mold producing cavity atop the glass master in a region defined by the upstanding walls, allowing the catalyzed silicone mixture to cure within the mold producing cavity and removing the mold from the mold producing cavity.

In accordance with still another aspect of this invention, there is provided a mixture for use as a mold of a glass master for permitting replication of the glass master. The mixture consists essentially of silicone, a catalytic mixture to promote curing of the silicone, and a light oil.

BRIEF DESCRIPTION OF THE DRAWINGS

For a fuller understanding of the nature and advantages of the invention, reference should be made to the following detailed description, taken in conjunction with the accompanying drawings, in which.

DETAILED DESCRIPTION

Figure 1:
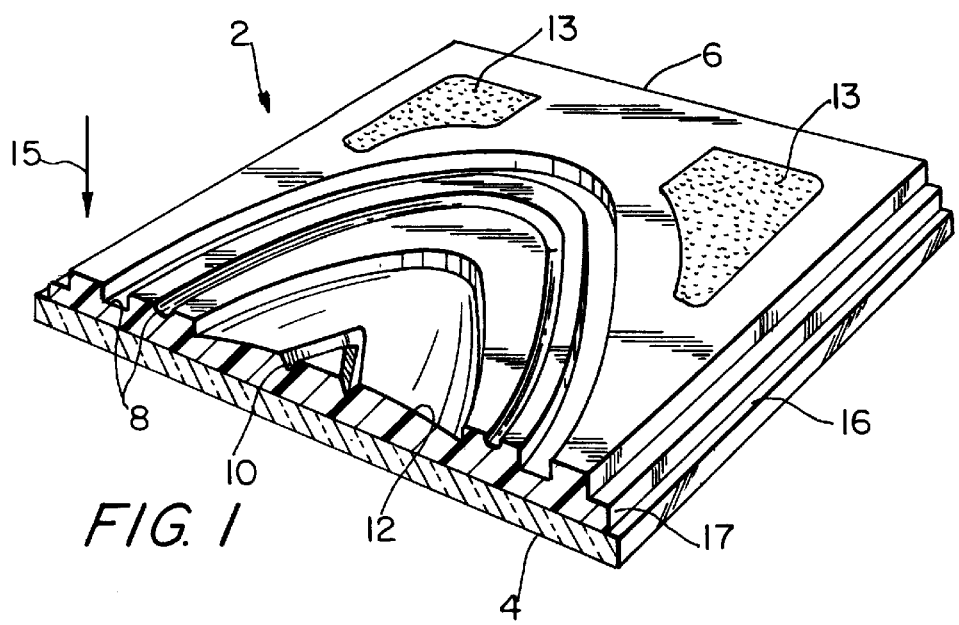
FIG. 1 is a perspective, partly cross-sectional view of a decorative window in which a resin layer including a deeply contoured surface is laminated to a sheet of glass.

Referring to FIG. 1, a decorative window 2, includes a glass sheet 4 onto which a plastic resin layer 6 is laminated. Laminated layer 6, which is preferably composed primarily of a clear polyester material, includes, for example, a number of deeply contoured decorative pictographic surface features which may be abstractions, such as grooves 8, beveled regions 10, and widely contoured sections 12. Laminated layer 6 may also include pictographic surface features configured to depict animals, birds, or other decorative designs. Such designs are pictographic in the sense that a bas-relief form is used, together with variations in surface texture, to represent three dimensional subjects with widely varying textures and colors. Various outer surfaces 13 of laminated layer 6 may also have finely-detailed surface textures, to provide translucence and to otherwise provide visual variations, which are preferably included among those surface textures conventionally applied to decorative glass windows, such as sand blasting, etching, and glue chipping. While laminated layer 6 is preferably transparent, it may also be composed primarily of a tinted material to provide a different visual effect. The overall shape of window 2 as viewed in the direction of arrow 15, may be rectangular, round, oval or any customized shape.

Laminated layer 6 extends as a single piece across glass sheet 4, except for a narrow peripheral region 16 used in the manufacturing process, as will be hereafter described, to provide a surface for clamping a mold to reproduce this layer 6. Layer 6 may also include a ledge 17 having a uniform thickness extending around its periphery. Decorative window 2 can be subsequently mounted within an external frame clamping either or both peripheral region 16 of glass sheet 4 and/or ledge 17 of laminated layer 6. If a variation of the manufacturing process is used, narrow peripheral region 16 can be eliminated.

In any case, after the window 2 is mounted as a decorative element, when it is viewed in a normal way, substantially in the direction of arrow 15, its entire visible front surface will be that of laminated resin layer 6. Similarly, if it is viewed from the opposite side, in a direction substantially opposite to that of arrow 15, its entire visible rear surface will be that of glass sheet 4. Thus, any possible difference between the material of this layer 6 and that of glass sheet 4 will not be readily distinguishable. Furthermore, when resin layer 6 is carried across glass sheet 4 in this way, a maximum benefit is obtained in combining the mechanical and thermal properties of the materials of this layer and the glass sheet.

The thickness of the thickest portions of laminated layer 6 is preferably approximately equal to that of glass sheet 4, since this relationship has been subjectively determined to produce a window which looks most like a solid glass decorative window. This thickness is sufficient to allow deeply grooved and contoured decorative patterns. Also, this relationship provides a good combination of the mechanical and thermal properties of glass and the plastic resin material.

Figure 2:
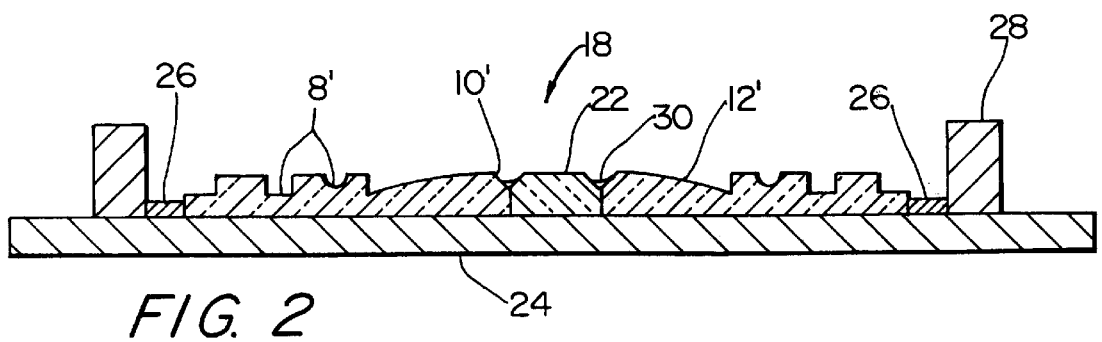
FIG. 2 is a cross-sectional elevation of a glass master prepared in accordance with the process of this invention for making replicas.

Referring first to FIG. 2, the manufacturing process for making decorative window 2 as a replica of a glass master will now be discussed with reference to FIGS. 2 through 4. The first step for making decorative window 2 as a replica of a glass master is the making of a glass master 18, which has features corresponding to the features desired in the replica. For example, glass master 18 includes grooves 8', beveled regions 10', and widely contoured sections 12', corresponding respectively to grooves 8, beveled regions 10 and widely contoured sections 12 to be reproduced in a replica, such as decorative window 2 shown in FIG. 1. Glass master 18 may also include separate transparent planar surface sections 22, and various other surfaces may receive surface texturing by sand blasting, etching, or by stripping away adhesive attached to a previously sand blasted area.

These techniques of contouring and surface texturing are well known to those skilled in the art of making decorative glass panels.

All portions of glass master 18 are adhesively mounted on a backing board 24, along with spacer strips 26 and a peripheral framework 28, which extend around the periphery of glass master 18 regardless of its shape. Spacer strips 26 are used to determine the overall thickness of the laminated resin portion 6 of the replicas 2 which will subsequently be reproduced. Small cracks between adjacent pieces of glass are filled by forming plaster fillets 30 in a caulking procedure. Finally, the untextured portions of glass master 18 are polished to a high gloss, and the glass master is waxed using a wax product such as Johnson's Paste Wax, which can be obtained from S. C. Johnson & Son, Inc. of Racine, Wis.

Figure 3:
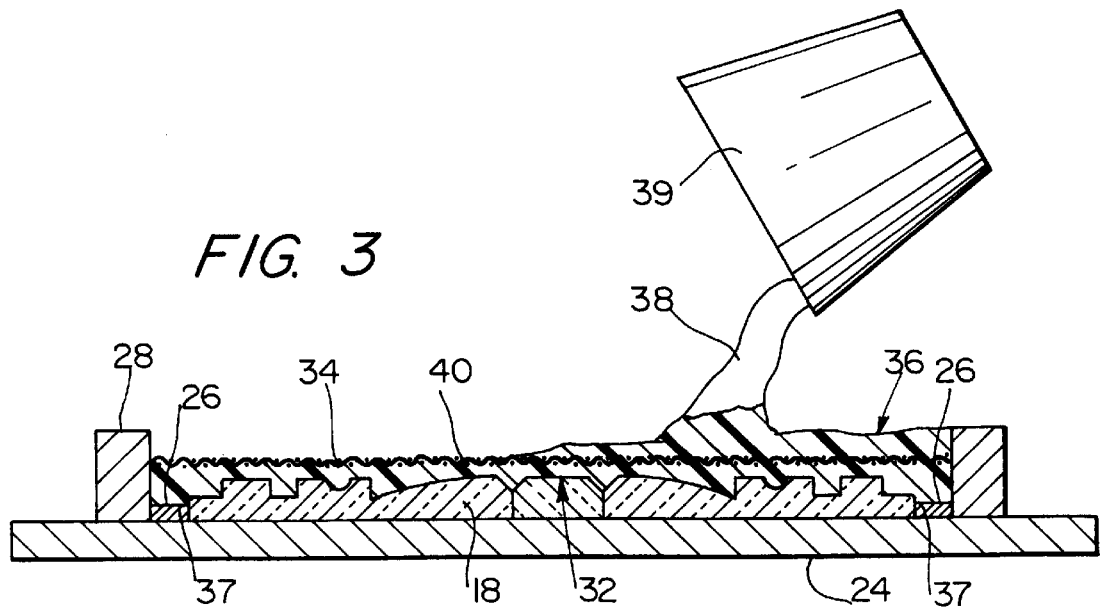
FIG. 3 is a cross-sectional elevation of a mold being prepared for making replicas of the glass master shown in FIG. 2.

Referring to FIG. 3, the second step for producing decorative window 2 as a replica of glass master 18 is the fabrication of mold 36 for duplicating the surface features of glass master 18. Fabricating mold 36 is accomplished by filling a mold producing cavity 32 atop glass master 18 and inside peripheral framework 28 with a catalyzed silicone to form mold 36. Peripheral walls 37, formed around the edges of mold 36 extend downward to the upper surfaces of filler strips 26. The thickness of filler strips 26 determines the overall depth of cavity 32 in mold 36 formed by the glass master 18. Adjusting the thickness of filler strips 26 can therefore be used to adjust the overall thickness of the resin portion 6 of the replica 2 being subsequently formed, thereby permitting the use of thick glass plate to facilitate the grinding of deeply contoured surfaces in glass master 18 without requiring that the resin portion 6 of the replica 2 be correspondingly and unnecessarily thick.

Cavity 32 is then filled with a mixture 38, hereafter described, from a container 39 to an intermediate level at which a section of screen wire 40 is laid to reinforce the mold 36 being produced. Then, the remainder of the cavity 32 above the screen wire 40 is filled with mixture 38, forming a flat upper surface. Thereafter, mixture 38 is allowed to cure at room temperature for approximately 24 hours to form mold 36. After curing, mold 36 is removed from glass master 18, filler strips 26 and peripheral framework 28.

Mixture 38 includes ten parts HS II RTV Silicone, available from Dow Corning Corporation of Midland, Mich., mixed with one part 10:1 Colored HS II Catalyst, also available from Dow Corning. In addition, a light oil additive, such as Hoppe's 1003, supplied by Penguin Industries of Coatsville, Pa. is mixed with a fast curing tin catalyst, such as HS II RTV Catalyst, also available from Dow Corning. About 30 cubic centimeters of oil additive and 10 cubic centimeters of fast curing catalyst is added per pound of silicone mixture. These components are mixed first with each other, and then with the mixture of RTV Silicone and Colored HS II Catalyst. Before the resulting mixture 38 is poured into mold 36, it is placed under vacuum for three to five minutes to remove entrapped air.

The use of the light oil additive makes it unnecessary to apply a conventional mold release agent to the surface of the glass master before the catalyzed silicone is poured. If less than 20 cubic centimeters of oil is added per pound of silicone mixture, this effect is lost and a conventional mold release agent is needed to prevent the tearing of the mold due to adhesion between the mold and the glass. If more than 40 cubic centimeters of oil is added per pound of silicone mixture, the oil will migrate to the surface of the mold leaving an unacceptable image on the surfaces of replicas formed within the mold. This migration in a mold having too high an oil content occurs over time; the useful life of such a mold is reduced thereby from a capability of producing over thirty satisfactory replicas to six or less. Thus, adding light oil as an additive in the proper proportion eliminates the need for and associated problems with conventional mold release agents, such as, impressions left on the surface of the mold, which in turn leave unacceptable blemishes on the smooth surfaces of the replicas.

The wax previously applied to the glass master is also a preferred part of this process. If this waxing is not done, a coating of silicone will be left on the surface of the glass master when the mold is removed. In this case, the mold will be suitable for making replicas, but the glass master will not be suitable for making additional molds when they are required. Using wax in this way does not cause unsatisfactory images to be left on replicas subsequently made using the mold.

The use of a fast curing tin catalyst hastens the curing process, allowing more rapid mold fabrication. If too much tin catalyst is used, the curing process does not allow an adequate working life for the mixture to be properly applied within the mold cavity. Using 10 cubic centimeters of this catalyst per pound of silicone mixture produces a working life of about one half hour, which has proven to be adequate for this purpose.

Figure 4:
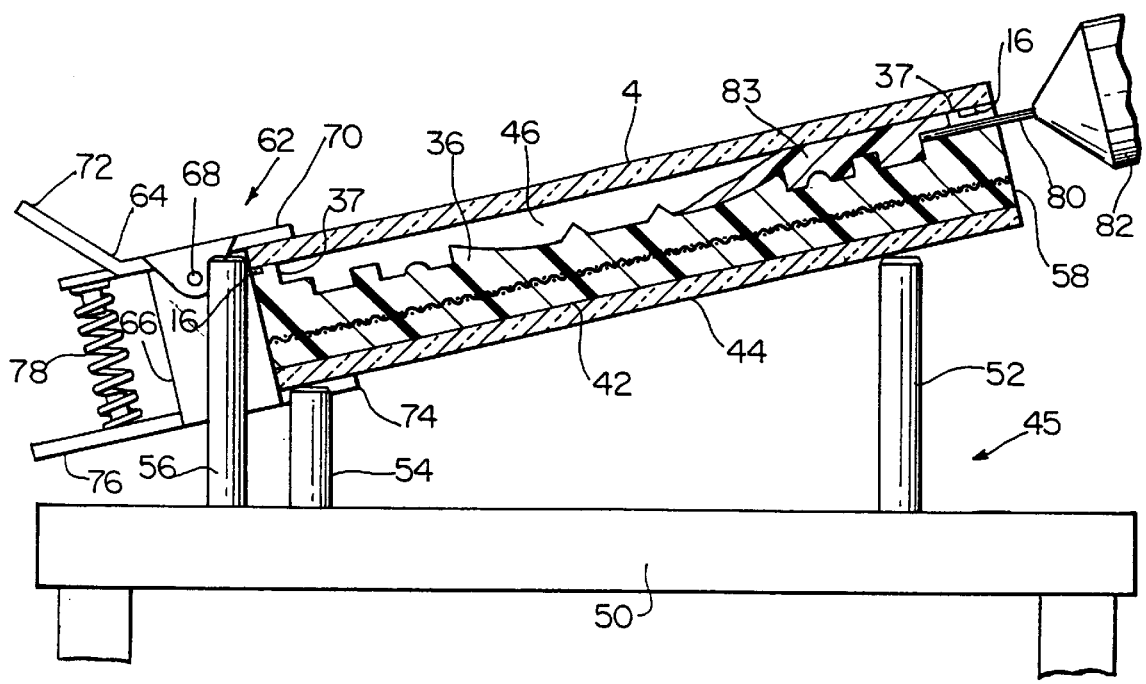
FIG. 4 is a cross-section a l elevation of the mold shown in preparation in FIG. 3 being filled with resin material to form a replica of the glass master shown in FIG. 2.

Referring now to FIG. 4, the third step for making decorative window 2 as a replica of glass master 18 is using mold 36 to form a replica. Mold 36, after being removed from glass master 18, is inverted from the position in which it is fabricated, and the flat surface 42 thereof is placed against a supporting sheet of glass 44 in a fixture 45, with cavity 46, reflecting the shape of glass master 18, directed upward. Fixture 45 is capable of supporting sheet of glass 44 in either a slanted position or in a level position. Fixture 45 may include, for example, several rows of pegs 52, 54 and 56 upstanding from a table 50. Sheet of glass 44 may be placed on a forward row of pegs 52 and either on a lower rear row of pegs 54 or on a higher rear row of pegs 56. Sheet of glass 44 is initially placed in a slanted position, resting on rows of pegs 52 and 54, so that one end 58 of mold 36 extends upward.

At this point glass sheet 4, which preferably is a tempered sheet of glass, is prepared for becoming the glass portion 4 of the decorative window 2, as previously discussed in reference to FIG. 1. In a preferred version of this process, this preparation includes coating the side of glass sheet 4 which is to be attached to the resin layer with an adherent chemical which adheres to both the glass and the resin. Preferably, the adherent chemical permits the resin and glass to adhere to one another by the cross-linkage of polymer chains with the structure of the adherent.

In the preferred process, glass sheet 4 is washed and one surface is coated with a mixture of alcohol, water and organosilane ester, which may be obtained as Type A174 from Union Carbide of Atlanta, Ga. The preferred mixture for this purpose is composed of equal volumes of deionized water and denatured alcohol to which 0.5 per cent, by volume, of organosilane ester is added. The water and alcohol evaporate, leaving a dried coating of organosilane ester on the surface of glass sheet 4. This coating has been found to function as an adherent when applied in this manner. This method is superior, in terms of the adhesive properties of the lamination subsequently formed, to the use of organosilane ester simply as a component in the catalyzed resin mixture.

After the adherence coating processing is complete, glass sheet 4 is placed atop mold 36, against upstanding peripheral walls 37, with the coated side of glass sheet 4 facing downward into mold cavity 46. Next, spring clamps 62 (only one of which is shown) are placed in spaced apart relationships around the three sides of mold 36, remote from raised end 58. Each spring clamp 62 includes a clamping bracket 64 pivotally mounted on a lower bracket 66 by a rod 68. Each clamping bracket 64 includes a clamping tab 70, extending atop glass sheet 4, and an outward extending clamping handle 72. Similarly, each lower bracket 66 includes a lower tab 74 extending under glass sheet 44 and an outward-extending lower handle 76. A compression spring 78, extending between clamping bracket 64 and lower bracket 66 outside pivot rod 68, applies clamping forces between tabs 70 and 74, so that the lower surface of glass sheet 4 is locally clamped against peripheral walls 37 of mold 36. Spring clamps 62 may be manually loosened for installation or removal by applying manual pressure between the outer surfaces of clamping handle 72 and lower handle 76.

A hollow needle-like tube 80, extending from a supply chamber 82 is then inserted into upper end 58 of mold 36 to fill mold cavity 46 with a catalyzed transparent liquid resin 83. A mixture of 97.3 per cent clear polyester resin, supplied as Product 249A by B.P. Chemicals of Ft. Wright, Ky., 1.0 per cent organosilane ester, supplied as Type A174 by Union Carbide of Atlanta, Ga., 0.85 per cent methylethylketone peroxide, supplied as Cadox-M-50 by Akzo Chemical of Chicago, Ill., and 0.85 per cent heat curing catalyst, supplied as USP-240 by Witco Chemical of Richmond, Calif. has been found to work well as the catalyzed resin for this application. Alternately, a tinted plastic resin could be used to obtain a different visual effect in the replica.

The resin curing process is begun by the methylethylketone peroxide and completed, as the exothermic reaction raises the temperature of the mixture to about 200 degrees F., by the heat curing catalyst. The organosilane ester within the mixture, together with the layer of this material which has dried on the surface of the glass sheet 4, promotes the adhesion of polymers from the resin 83 to the surface of glass sheet 4, particularly by the cross-linking of polymer chains within the resin with organosilane ester adhered to the glass surface. These products may be properly mixed and dispensed through tube 80 by means of a resin transfer molding machine, such as a Multiflow CVR type, supplied by Liquid Control Corporation of North Canton, Ohio.

This contact between peripheral walls 37 of mold 36 and the underside of glass sheet 4 prevents the flow of liquid resin into the space between these surfaces, forming narrow peripheral regions 16 of glass sheet 4 outside mold cavity 46. If it is necessary to form a resin layer extending to the edges of the glass sheet, alternate sealing means can be used, such as sealing against these edges.

After a measured amount of liquid resin 83 is introduced into cavity 46 in this way, the assembly of mold 36, glass sheets 4 and 44, and spring clamps 62 is brought into a level position within fixture 45, with glass sheet 44 resting on pegs 52 and 56, in order to allow the resin 83 to flood the mold completely and evenly. One or more additional spring clamps 62 are placed along mold end 58 so that the mold is completely sealed with peripheral walls 37 held against the lower side of glass sheet 4. Any air bubbles, which may have become trapped within the liquid resin 83 during these mixing and pouring processes, are easily seen by inspection through glass sheet 4 and may be removed by applying a needle attached to evacuation means (not shown) extending through the silicone mold 36, which is self-sealing after such small punctures.

This mold assembly is then left in place within fixture 45 to cure. A complete cure is achieved at room temperature in one to two hours. After curing, spring clamps 62 are removed, and a replica, consisting of glass plate 4 and a laminated cured resin layer 6 shaped within mold cavity 46, is removed from mold 36. Additional replicas of the glass master 18 may be produced using mold 36 in the same way again, and additional molds may be produced, if required, using glass master 18 in the same way.

The replica thus formed, which has been previously described as decorative window 2 in reference to FIG. 1, can be used in a number of ways. For example, this decorative window 2 may be directly used, being enclosed in a suitable metal framework, with elastomeric strips clamped along the surfaces of narrow peripheral region 16 of glass plate 4 and against ledge 17 of laminated resin layer 6, for use as a shower door. In this application, the window is preferably oriented with laminated resin layer 6 facing outward, so that the appearance of this layer can be more readily appreciated, and so that soap and hot water residues may be more easily removed from an inward surface of glass plate 4. A scratch-resistant coating can also be applied to the outer surface of laminated resin layer 6 in accordance with techniques well known in the arts of plastic molding and of producing plastic optical elements, such as eyeglass lenses.

Figure 5:
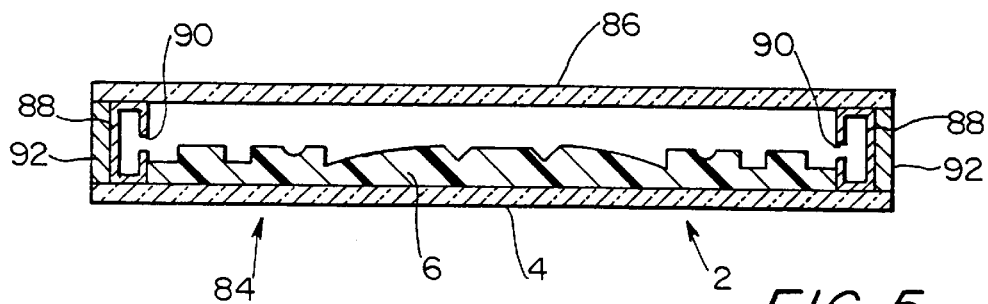
FIG. 5 is a partial cross-sectional elevation of an alternate embodiment of the invention, in which a second sheet of glass is supported above the resin section in a spaced-apart relationship.

As shown in FIG. 5, in an alternative embodiment, decorative window 2 may be included within a window assembly 84 having a second glass sheet 86 fastened to glass sheet 4 in a spaced apart relationship to enclose laminated resin layer 6. Window assembly 84 includes, along each edge, a hollow metal tube 88, of a type which can be obtained as a Trimline Spacer from the Hygrade Company of New York, N.Y. To form a framework, adjacent tubes 88 are joined at the corners with plastic "L" shaped brackets (not shown) extending into their hollow centers. Tubes 88, which include inward directed rows of small holes 90, are partly filled with a desiccating material to prevent the formation of condensed moisture on surfaces within window assembly 84. The regions between the outer surfaces of tubes 88 and the edges of glass sheets 4 and 86 are filled with a sealing material 92, such as Polypo, provided by the Product Research Corporation of Atlanta, Ga., to form a hermetic seal.

One advantage of the configuration of window assembly 84 is that both exterior sides are glass. This simplifies cleaning, since dirt cannot become trapped in the grooves and other features of laminated resin layer 6, and presents the most scratch resistant surfaces to the outside on both sides. Furthermore, the "dead air" space, where trapped air is not circulated, between glass sheets 4 and 86, greatly reduces the transfer of heat in either direction through the window assembly. For these reasons, the configuration of window assembly 84 is particularly suitable for exterior window openings in buildings.

Figure 6:
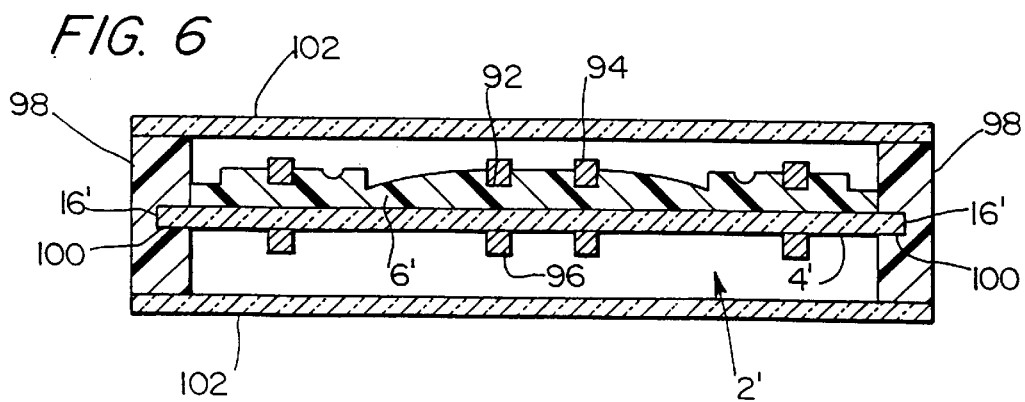
FIG. 6 is a partial cross-sectional elevation of a second alternate embodiment of the invention, in which sheets of glass are supported in spaced-apart relationships on either side of the sheet of glass to which a resin layer is laminated.

Referring to FIG. 6, another useful configuration can be obtained, in a second alternative embodiment, by enclosing a decorative window 2', which is similar to decorative window 2, except for the fact that laminated resin layer 6' has been contoured in the molding process to include a number of channels 92 in a reticulated pattern. Strips of a framework 94 having a similar pattern are adhesively attached to further simulate a structure composed of a number of individual pieces of glass attached by lead strips in the conventional way. Framework 94 may consist, for example, of a number of lead alloy strips welded together, of a one-piece lead die casting, or of a one-piece injection molded thermoplastic part. The pattern formed by the lower surfaces of grooves 92 may be flat, providing a uniform thickness between these surfaces and glass sheet 4', or some of these surfaces may be angled relative to glass sheet 4', thereby providing a simulation of separate glass sections installed at various angles. An additional framework 96, having a pattern opposite to that of framework 94, is adhesively attached to the opposite surface of glass sheet 4' to increase the effectiveness of this simulation. Thus, while a multi-pane window is simulated, the advantages are retained of having a single laminated layer of resin across glass sheet 4', except for narrow peripheral regions 16'.

Decorative window 2' may also be surrounded by four strips of elastomeric spacers 98, having intermediate slots 100, into which end portions of glass sheet 4' extend. Spacers 98 may be obtained as Swiggle Strips from Tremco of Cleveland, Ohio. Spacers of this kind can also be easily curved to fit around oval or round decorative windows. After assembly with additional glass sheets 102 and 104 on each side of decorative window 2', heat and pressure are used to melt the surfaces of spacers 98 adjacent to the glass surfaces, thereby providing adhesion and hermetic sealing.

Thus, in summary, the preferred method for manufacturing the decorative glass 2 structure begins with the fabrication of a glass master 18 by techniques well known in the art of making decorative glass windows. Such techniques may include, for example, grinding away portions of a relatively thick piece of glass to form ornamental designs or conventional surface texturing methods may be used to texture the glass surface. Alternatively, the glass master 18 may consist of an assembly of various beveled glass segments commonly found on lead crystal glass assemblies. In any case, the glass master 18 is adhesively attached to an underlying support plate 24 with a surrounding frame 28, the glass master 18 is polished, where appropriate, to a high gloss, and the master 18 is waxed.

Next a silicone mold 36 is made to the shape of the glass master 18 by pouring a mixture of silicone and a catalyst over the glass master 18, filling the space inside the surrounding frame 28. After curing, the silicone mold 36 is pulled away from the glass master 18, and the flat side 42 of the mold 36 is placed atop a waxed surface of a mold-supporting sheet of glass 44 with the cavity 46 formed in the mold by the glass master 18 directed upward.

In a preferred embodiment of this process, the composition of the silicone mold 36 includes a small portion of a light oil additive, which permits the separation of the mold from the glass master without damage to the mold. The light oil additive provides a significant mold releasing advantage over conventional prior art techniques of using mold release agents on the surface of the glass master 18, since surface defects in the replicas are avoided. Without a clean release, the mold becomes unusable or only usable for a small number of replications. Next a sheet of clear glass 4 is cleaned and preferably coated with organosilane ester to promote adhesion between the resin and the glass. Glass sheet 4 is then clamped in place atop the mold 36, creating a cavity 46 identical to the glass master 18.

A liquid catalyzed resin 83, which is preferably a mixture of clear polyester resin with a catalyst and with organosilane ester, is then poured or pumped into cavity 46. The molding form, consisting of mold 36 and glass sheets 4 and 44, may be tilted and subsequently leveled to aid the inward flow of resin 83 and the leveling of resin 83 within the cavity. After curing, the glass sheet 4 atop the mold 36 is separated from the mold 36, leaving decorative replica 2 as glass sheet 4 having laminated thereon plastic resin layer 6. Many additional decorative glass replicas 2 of master 18 can be made using the same mold 36, and, if necessary, additional molds 36 can be made from the master 18 by the same process.

A number of advantages relative to the prior art are simultaneously achieved by the invention described above. While decorative glass replicas 2 are manufactured for a small fraction of the cost of real decorative glass products produced by traditional methods, the appearance of the replicas 2 of the instant invention is strikingly similar to the real glass products of the prior art. The resin materials described have excellent optical clarity, with a greenish shading in thick sections very similar to that of glass. Because the resin layer 6 of replica 2 can be quite thick, the deeply contoured sections typical of decorative glass can easily be reproduced. This molding process described above is especially useful for reproducing fine detail, such as surface texturing, and sharp internal and external corners. The application of the process of this invention results in very good adhesion between sheet glass 4 and the laminated resin portion 6, preventing delamination due to stresses resulting from thermal expansion, even when a thick resin layer is applied, and when the window is in a location having severe temperature swings, such as in an exterior architectural application.

The mechanical and thermal properties of replica 2 are in many ways superior to both a traditional decorative glass window or a window composed entirely of a thermoplastic material, such as polycarbonate. Since the resin layer 6 and the glass 4 of replica 2 are tightly adhered, the toughness of the resin layer 6 reduces the danger that the glass will break in impact situations, while the stiffness of the glass increases the flexural rigidity of the replica 2 window. Further, the relatively low thermal conductivity of the resin layer 6 reduces the flow of heat through the replica window 2. The thermal insulation properties can be further improved by the implementation of the alternative embodiments, with additional panes of glass and intervening air spaces.

While the method of this invention produces a replica of a glass master having deeply contoured surfaces and pictographic elements, which may be abstractions or bas-relief representations of various subjects, many of the prior art processes produce only wavy surfaces with a degree of randomness. An example of such a process is that of U.S. Pat. No. 3,848,046 to Machet. While the same general type of plastic resin material may be used to form an article, this Machet process provides only random wavy nodularity of the surface. Another example of such a process is that of U.S. Pat. No. 3,713,958 to McCracken, in which a rod or other tool is used to provide a wavy or irregular surface to a resin coating applied to a glass pane, before the completion of the curing process.

While the method of this invention produces a high quality replica of surface textures, as well as of deeply contoured surfaces and pictographic elements, each time the mold is used to produce a replica, the implementation of many of the prior art processes requires the regeneration of surface textures each time a part is made. For example, the implementation of U.S. Pat. No. 3,713,958 to McCracken requires the use of tool to generate this surface for each part, while U.S. Pat. No. 4,619,850 to Charlton requires that glue chipping, sand blasting, etc. be done, if they are needed, on each new pane of glass.

With the process of this invention, the glass sheet 4 is a single, continuous piece of glass, even if the resin layer 6 is designed to provide the appearance of a composite made from a number of individual pieces of glass, such as a traditional leaded glass window. A leaded glass replica 2 may therefore be used in applications where building codes require the use of single-pane windows. Further safety advantages can be achieved by using tempered glass for the glass sheet 4.

Furthermore, the resin layer 6, with its deeply contoured surfaces, is also a single continuous piece of material, covering the entire panel, except at most for narrow peripheral regions 16. This contrasts with the method taught in the alternative construction of U.S. Pat. No. 4,488,919 to Butler, where substantially thick sheets of transparent material, which may have faceted or curved outer surfaces, but which are limited in area to individual design segments to be bounded by externally applied lead strips, are attached to a base pane by means of a pressure sensitive adhesive. This also contrasts with a modified version of U.S. Pat. No. 4,619,850 to Charlton, in which a beveled glass segment is adhesively bonded to the glass within an opening in a came network. This use of a continuous contoured layer also contrasts with the configuration of U.S. Pat. No. 4,904,513 to De Nicolo, wherein a plurality of beveled flat glass elements are bonded to a backing pane. The use of a continuous resin layer 6 provides mechanical and thermal properties of continuous material and significantly reduces manufacturing costs, when compared with the alternative of assembling a number of individual segments on a pane using a pressure sensitive adhesive. Furthermore, since the entire front surface of the decorative window is composed of the plastic resin material, any differences between this material and glass cannot easily be seen or felt.

Although the invention has been described in preferred forms or embodiments with some degree of particularity, it is understood that this disclosure has been made only by way of example, and that numerous changes in the details of construction, fabrication and use may be made without departing from the spirit and scope of the invention.

What is claimed is:

1. A process of preparing a decorative glass window having a cured resin layer adhered to a glass sheet with a decorative design formed in said cured resin layer and remote from said sheet, said process comprising the steps of:

coating said glass sheet with an adherent material;

clamping a mold to said glass sheet, said mold having a flat peripheral region and a cavity extending inward within said peripheral region, said peripheral region being in contact with a said glass sheet;

filling said internal cavity with a catalyzed transparent plastic resin including said adherent material allowing said resin to cure within said internal cavity; and removing said mold from said cured resin and adhered glass sheet.

2. A decorative glass window prepared by the process recited in claim 1 wherein said adherent coating adheres to said glass and adheres to said resin by the cross-linking of polymers from said resin with said adherent.

3. A decorative glass window prepared by the process recited in claim 1 wherein said adherent material is organosilane ester.

4. A decorative glass window prepared by the process recited in claim 3 wherein said adherent material is coated on said glass sheet as a mixture of water and alcohol to which about 0.5 percent organosilane ester, by volume, has been added.

5. A decorative glass window prepared by the process recited in claim 3 wherein said catalyzed resin consists essentially of a transparent plastic resin, a catalytic agent for curing said resin and organosilane ester.

6. A method for laminating a plastic resin layer to a glass sheet, to form a decorative glass window, said resin layer having a first side shaped in accordance with a cavity of a mold and a second side, opposite said first side, laminated to one side of said glass sheet, said method comprising the steps of:

coating said one side of said glass sheet with organosilane ester;

clamping said one side of said glass sheet against peripheral surfaces of said mold around said cavity;

flooding said cavity with a catalyzed resin mixture composed essentially of a plastic resin, a catalyst, and organosilane ester;

allowing said catalyzed resin mixture to cure within said mold; and removing said glass sheet and cured resin layer adhering thereto from said mold.

7. The method of claim 6 wherein said plastic resin is a clear polyester resin and said catalyst is approximately equal parts of methylethylketone peroxide and a heat curing catalyst.

8. The method of claim 6 wherein said step of flooding includes:

orienting said mold in a position with an elevated side;

introducing said mixture at said elevated side; and orienting said mold to a level position.

9. A method of making decorative glass using a mold having a cavity portion with a decorative surface, the method comprising the steps of:

affixing the mold to a glass sheet with the cavity portion facing the glass sheet to form a space between the glass sheet and the decorative surface;

injecting a curable resin into the space between the glass sheet and the decorative surface; and removing the mold from the glass sheet after the resin has cured leaving a layer of cured resin adhered to the glass sheet and having an outer decorative surface defined by the decorative surface of the mold.

10. The method of claim 9 wherein the decorative surface of the cured resin includes bevel shaped portions.

11. The method of claim 9 wherein the resin is transparent.

12. The method of claim 9 wherein the curable resin contains a catalyst and organosilane ester.

13. The method of claim 12 wherein the resin is a polyester and the catalyst includes methylethylketone peroxide.

14. The method of claim 12 wherein the resin is a polyester and the catalyst includes a heat curing catalyst.

15. The method of claim 9 further comprising the step of placing the glass sheet and the cured resin layer within a frame to form a window.

16. The method of claim 9 wherein the cured resin layer and the glass sheet are of approximately equal thickness.

* * * * *